United States Patent [19]

Franssen et al.

[11] Patent Number: 5,990,067

[45] Date of Patent: Nov. 23, 1999

[54] CONCRETE SURFACE CLEANING COMPOSITION AND METHOD

[76] Inventors: Todd Franssen; Carla Franssen, both of 1428 MacPool St., Dacono, Colo. 80514; Leonard R. Carlo, 2825 Lyncrest Dr., Colorado Springs, Colo. 80918

[21] Appl. No.: 09/205,477

[22] Filed: Dec. 4, 1998

Related U.S. Application Data

[60] Provisional application No. 60/067,831, Dec. 5, 1997.

[51] Int. Cl.$^6$ .............................. C11D 3/382; C11D 3/14; C11D 3/10
[52] U.S. Cl. .................... 510/240; 510/368; 510/382; 510/395; 510/462; 510/509
[58] Field of Search .................................... 510/240, 382, 510/389, 395, 396, 462, 509, 368

[56] References Cited

U.S. PATENT DOCUMENTS

| | | | |
|---|---|---|---|
| 966,060 | 8/1910 | Severns | 510/278 |
| 1,407,502 | 2/1922 | Weigle | 510/139 |
| 1,723,521 | 8/1929 | Plank | 510/215 |
| 2,380,830 | 7/1945 | Fiedler | 510/139 |
| 2,384,006 | 9/1945 | Bleakney | 510/399 |
| 2,494,827 | 1/1950 | Munter | 510/399 |
| 2,601,862 | 7/1952 | Thomson | 134/7 |
| 2,605,236 | 7/1952 | McCants | 252/443 |
| 2,805,204 | 9/1957 | Adams, Jr. | 252/88 |
| 3,630,931 | 12/1971 | Salomone | 510/240 |
| 3,673,095 | 6/1972 | Archer | 252/88 |
| 3,701,734 | 10/1972 | Stover | 252/88 |
| 4,000,092 | 12/1976 | Wentler | 510/441 |

*Primary Examiner*—Yogendra Gupta
*Assistant Examiner*—Dawn L. Garrett
*Attorney, Agent, or Firm*—Sheridan Ross P.C.

[57] ABSTRACT

A composition and method for cleaning concrete and asphalt surfaces from oil and grease stains includes a combination of various constituents, namely baking soda, calcium carbonate, crushed corn, detergent, fly ash, portland cement and/or kiln dust. Other compositions also include quartz sand, ground corn cobs, microorganisms and coloring agents. The method involves contact of the present formulation with concrete/asphalt surfaces, preferably administered in lines spanning the dimensions of the oil stain to be cleaned. The material is swept over the oil stain with a broom or other suitable device to achieve a relatively uniform application. Water is applied to dampen the formulation, thus activating the detergent in the formulation and to hold down dust during the cleaning operation. The formulation rests on the surface for a sufficient amount of time to permit the detergents and other agents to dissolve and/or otherwise dissipate the oil stain. The formulation is then collected from the oil stain surface resulting in a cleaned surface free of oil and grease stains.

13 Claims, 2 Drawing Sheets

CONCRETE SURFACE CLEANING COMPOSITION AND METHOD

RELATED APPLICATIONS

This application claims priority from U.S. Provisional Patent Application No. 60/067,831, filed Dec. 5, 1997. The entire disclosure of the provisional application is considered to be part of the disclosure of the accompanying application and is hereby incorporated by reference.

FIELD OF THE INVENTION

The present invention relates to a compound formulation useful in cleaning concrete surfaces, and in particular, finds application in removal of oil and grease stains on concrete surfaces.

BACKGROUND OF THE INVENTION

A persistent and recurring problem in the storage of motor vehicles is that such motor vehicles drip oils of various types, including transmission oil and motor oil. When a vehicle is parked for a length of time, such oils tend to accumulate and pool beneath the vehicle, causing stains on the underlying concrete surface. Such staining is particularly prevalent when older automobiles are parked or stored. Moreover, concrete surfaces upon which vehicles are repeatedly parked, such as gas stations, fire and police department garages, car lots, etc., typically build up years of oil stains, which repeatedly contact and saturate concrete surfaces, leaving a permanent stain on the concrete which is impossible to remove by simply washing such surfaces with water, even if detergents are used therewith.

Others have developed machines and procedures that may be useful in removing oil stains from concrete surfaces, including U.S. Reissue Pat. No. 35,073, directed to a machine that uses a moving platen to grind clay and sand mixtures into concrete surfaces, thereby creating frictional heat which causes oil in the concrete surface to be absorbed in the cleaning compound itself. Removing oil spots using such a method, however, requires the expenditure of money for the mechanical equipment needed to create the frictional heat required and thus, necessitates repair and replacement of such machines after significant use.

A need therefore exists for a simple, economical and effective formulation that can be used to remove oil spots from concrete surfaces without the necessity of expensive machinery and without the requirement that frictional heat be generated to accomplish such cleaning procedure.

SUMMARY OF THE INVENTION

The present invention accomplishes cleaning of oil-stained concrete and/or asphalt surfaces by contacting such stained surfaces with a particular formulation designed to remove such oil stains in a cost-effective, time-efficient and simple manner. A preferred formulation of the present invention includes a combination of five constituents, comprising baking soda; calcium carbonate; crushed corn; detergent (preferably containing a bleach component; and one or more of the following: fly ash; Portland cement; and kiln dust. In addition to this preferred embodiment, appropriate substitutions can be made, for example, crushed corn and/or crushed corn cobb material can be replaced with another suitable material that is capable of reducing dust generation due to a sufficient moisture content of such material. In particular, a substance known as "ABSORBSALL™" can be used in place of crushed corn. Other functions of each separate component are discussed in the detailed description as set forth below. The particular preferred composition ranges for each component of the present formulation, given a total of 500 lbs. of formulation, are as follows:

| | |
|---|---|
| Quartz sand | 50–200 lbs. |
| Detergent | 25–150 lbs. |
| Calcium Carbonate | 25–150 lbs. |
| Crushed Corn/ground corn cobs | 5–200 lbs. |
| Baking Soda (Sodium Carbonate or Sodium Bicarbonate) | 5–200 lbs. |
| Fly Ash; Portland Cement; Kiln Dust | (the remainder up to 500 lbs) |
| Micro-organisms | 5–200 lbs. |

In the above embodiments, if Fly Ash and Kiln Dust are utilized, at least 50 pounds of Portland Cement should be used to provide the desired heaviness of the material, thus preventing any substantial light dust component that fails to adhere to the working surface. Moreover, in a combination of Fly Ash/Portland Cement, the following ratios are found to be particularly advantageous: Preferably a 50/50 combination, more preferably a 75/25 percent combination and most preferably an 80–20% combination Fly Ash to Portland Cement.

The present invention further includes a method for utilizing the claimed formulation whereby a sufficient amount of the formulation is distributed at least on one side of an oil stain on a concrete surface. A broom or other device is then used to spread the formulation to and fro so that the formulation is worked into the pores and grain of the concrete surface. For heavier stains, a more vigorous to and fro motion and/or swirling motion utilizing a broom, brush or other suitable device is suggested. A mist of water is then applied to the surface of the spread-out formulation, such amount of water being sufficient to dampen (but not thoroughly soak) the formulation. The water reacts with the detergent, as well as other components in the formulation, to activate such components to assist in the cleaning operation. Further agitation of the damp formulation on the concrete surface can be achieved using brooms or other similar devices so that the entire stained area is sufficiently contacted. A sufficient amount of time is permitted for the formulation to remain in contact with the concrete surface, typically at least about 15 min.–½ hour, to permit the oil in the concrete surface to be dispersed. The remaining formulation on the surface of the concrete is then scooped or swept up for disposal and/or reuse for another cleaning operation.

While not bound by theory, the present inventors believe that the present formulation and method works by having the oil broken down and/or absorbed into a concrete surface, rather than being absorbed by the formulation. Indeed, after the formulation has been spread, dampened and collected from an oil-stained concrete surface, the formulation does not appear to be darkened to a significant extent, thus leaving the present inventors to believe that the formulation does not necessarily absorb the oil material to achieve its cleaning of the concrete/asphalt surface.

Other components of the formulation that may be added include quartz sand, preferably of a 70 grade nature, present in a 500 lb. formulation in an amount of between 50 and 200 lbs., and most preferably about 100 lbs. Coloring agents can also be added to the formulation depending upon what surface is to be cleaned. For example, if a black asphalt surface is to be cleaned, a dark dye and/or blackener component may be added to achieve desired color characteristics of the cleaned surface. Additional pigmentation components including red, green, blue, etc. can be added, typically such components present in an amount of between 3 and 10 lbs. in a 500 lb. formulation, preferably about 5 lbs.

The cleaned concrete surface is significantly free of any pre-existing oil stain and in most cases, the appearance of freshly-poured concrete is achieved. Reapplication of the formulation and operation of the present method can be repeatedly performed in the event of further oil staining upon such surface. It has been found that repeated applications and use of the present formulation produces a prophylactic effect on subsequent oil stains and makes the removal of subsequent oil spots even easier and more time-efficient than when the formulation is first utilized.

DETAILED DESCRIPTION OF THE PREFERRED EMBODIMENT

Figure 1:
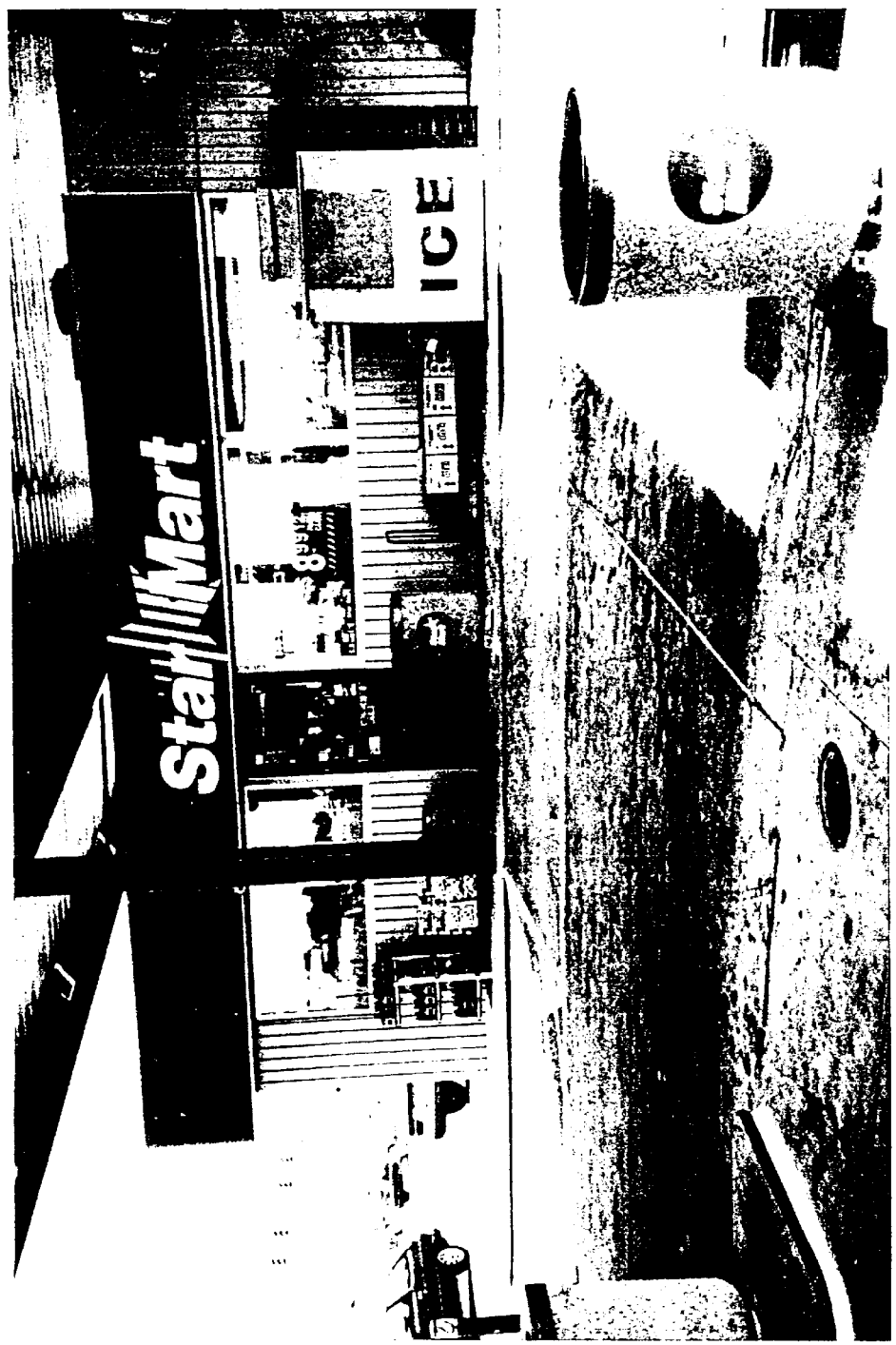
FIG. 1 is a picture of oil-stained concrete caused by numerous vehicles over time.
Figure 2:
FIG. 2 is a photograph of the identical space as pictured in FIG. 1. after the cleaning formulation of the present invention has been applied in accordance with the present method.

The present invention comprises a particular combination of constituents that work together in a manner to achieve superlative cleaning of stained concrete surfaces, such stains including stains resulting from organic compounds such as motor oil, transmission oil, power steering fluid, etc., as well as stains caused by rust deposits and other similar types of mineral oxidation stains.

The primary component of the present formulation is one or a combination of the following components: fly ash (either F or C class, but preferably F class fly ash given its grey color and its ability to resist hardening after contact with water); Portland cement; and kiln dust (particularly for tan-colored concrete surfaces). A particularly preferred combination of the above-referenced constituents includes approximately 80% F fly ash combined with 20% of Portland cement. The primary purpose of combining the fly ash/Portland cement/kiln dust is to provide a "like-appearing" substance to the surface to be cleaned.

A further constituent of the present formulation is a detergent. Preferably, the detergent is provided in granular form rather than in liquid form. The detergent can be of any particular brand manufacturer, and is selected so that it has the capability of interacting with organic compounds in a manner so that it acts as a solvent to either dissolve and/or release the bonds between such organic solvents and the concrete surface being cleaned. Preferably the detergent utilized does not generate an excessive amount of suds or foam. In a preferred embodiment, the detergent includes a bleach component, preferably approximately a minimal to 25 lbs. of bleach in a 500 lb. batch of the formulation, and most preferably, approximately 8 ounces of bleach per 500 lbs. Any amount of surfactants or other types of emulsifiers may be used with the detergent to achieve more efficient penetration into the concrete surface to be cleaned. In a preferred embodiment of the formulation, wherein the total weight of the formulation is approximately 500 lbs., preferably between 25 and 150 lbs. of detergent is utilized, more preferably between 30 and 85 lbs., and most preferably about 50 lbs. More than about 150 lbs. of detergent in a 500-lb. formulation mixture may result in excessive sudsing and creates cost inefficiencies without significantly improved cleaning characteristics.

A further constituent of the present formulation is a moisture-absorbent component which is capable of holding down dust generated during the cleaning operation and that facilitates the interaction of the various constituents of the cleaning formulation. A preferred constituent of the moisture-absorbent component is crushed corn. Preferably, such crushed corn has a moisture-content of between about 1–20%, and most preferably, about 15%. The use of chopped or crushed corn is preferred given that it is a natural, organic component that does not present any environmental problems. Although other absorbent materials, such a wood chips and sawdust can be used, such materials are typically not heavy enough to be effectively used as a dust-reduction, moisture-adding component that can be easily swept and combined with the other components of the present invention. Various embodiments of the present invention, however, may include wood chips and/or sawdust to act as a filler material and to create a lighter formulation for particular uses. Alternative components that may be used in place of crushed corn include "ABSORBSALL™" which is believed to be a clay-based composition. Cat litter can also be used in place of the crushed corn component, given its absorbent capabilities and granular consistency that provides the desired grittiness of the formulation and the necessary sweepable characteristics of the crushed corn embodiment. Crushed corn is readily available as a commodity item and typically 70% of the corn is crushed or cracked, so as not to be whole kernels of corn, with the remainder being various smaller corn kernels, including a percentage of powdered corn material. Crushed corn is particularly preferred because it provides a soapy-like texture that is believed to aid in the overall cleansing capabilities of the present formulation.

The amount of crushed corn/corn cobb component in a 500-lb. mixture of the present formulation is preferably between about 10 and 200 lbs., more preferably between 15–100 lbs., and most preferably between about 25 and 50 lbs.

Yet a further constituent of the present formulation is baking soda. The use of baking soda is to provide for a natural, environmentally-friendly whitener that promotes the desired color characteristics of clean concrete. Although some embodiments of the present formulation do not require any baking soda whatsoever, in a preferred embodiment, baking soda is added in an amount between about 5 to about 50 lbs. of baking soda in a total formulation amount of about 500 lbs. More preferably, between about 10 and about 30 lbs. of baking soda are utilized, and most preferably, about 20 lbs. of baking soda is included in such 500 lb. formulation. Use of over about 50 lbs. of baking soda in a 500-lb. formulation may produce undesirable white specks on a clean concrete surface. Moreover, more than about 50 lbs. of baking soda in a 500-lb. formulation may prevent desired dissolution of the baking soda when dampened in accordance with the method of the present invention.

A still further component of the present formulation is calcium carbonate. Calcium carbonate can be in the form of crushed marble, limestone, or dolomite and typically has a chemical formula of $CaCO_3$ and/or $MgCO_3$. Calcium carbonate provides a high-density component that is believed to condition the concrete to be cleaned and to promote the assimilation of detergent/soap, baking soda, crushed corn and fly ash/Portland cement/kiln dust of the present formulation to be pulled down into and interact with the concrete to be cleaned. The calcium carbonate thus acts to hold the product formulation onto the surface of the concrete, and conditions the concrete so as to prevent undesired brittleness of the concrete surface. In conventional cleaning operations, excessive amounts of detergent, water, and various clay materials can cause the surface of cement and concrete surfaces to flake off and to become brittle. The use of calcium carbonate in the present formulation prevents such undesired brittleness and thus acts to "condition" the surface to prevent such occurrences. The type of calcium carbonate utilized is preferably a fine granulation, preferably about grade 10. Although finer grades (e.g. grade 14) can be utilized, the costs of such finer formulations is not justified given the degree of cleaning achieved by use of a less fine calcium carbonate material. The calcium carbonate material utilized has a consistency similar to that of powdered sugar and is typically referred to as "food-grade" calcium carbonate.

In a preferred embodiment of the formulation where 500 lbs. of the formulation is utilized, between 25 and 150 lbs. of calcium carbonate is utilized, more preferably between about 35 and 100 lbs., and most preferably about 50 lbs. More than 150 lbs. of calcium carbonate in a 500-lb. total formulation may generate clean concrete having a blanched appearance, and thus, to prevent the clean surfaces from being excessively whitened with respect to surrounding uncleaned and non-oil-stained surfaces, less than about 150 lbs. of material should be utilized. An appropriate adjustment of the amount of calcium, and for that matter, baking soda, can be made to achieve desired whiteness of a cleaned concrete surface to match the particular coloration of such surface.

The major component of the present formulation is one or more of fly ash, Portland cement, or kiln dust. The use of Type F fly ash is preferred to the use of Type C fly ash, primarily because Type F fly ash has a grey color that is most consistent with the color of conventional surfaces. Moreover, Type F fly ash is believed to avoid hardening when contacted with water, and thus, remains in a granular form that is deemed desirable in the cleaning operation of the present invention. Kiln dust can be utilized for concrete surfaces having a tan-colored appearance. Portland cement can be used solely or in combination with one or more of the fly ash and/or kiln dust components to achieve desired color characteristics of the concrete to be cleaned.

In a particularly preferred embodiment, approximately 80% of fly ash is combined with approximately 20% of Portland cement. It has been found that Type C fly ash is slightly beige in color and hardens to some degree after contact with water. The type of Portland cement utilized is preferably Type I or II. It is advisable to utilize a combination of fly ash, kiln dust, and Portland cement to achieve the desired color characteristics of the concrete to be cleaned, especially since the formulation may be found to build up in grooves, pores and grains of the concrete to be cleaned, thus affecting the final coloration thereof.

A step of pre-matching the color of the concrete to be cleaned with appropriate combinations of Portland cement, fly ash and kiln dust is preferably performed prior to creation of a formulation for a particular use.

The amount of the fly ash/Portland cement/kiln dust component in relationship to the above-described constituents is such that, after the above-described constituents are added in their respective amounts, the remainder of the 500 lbs. of the total material is provided. In a preferred embodiment, the fly ash/Portland cement/kiln dust component comprises at least about 50% of the total formulation, more preferably about 60% of the formulation, and most preferably about 80% of the total formulation.

When cleaning asphalt surfaces with the present formulation, an additional blackener component may be added, such as Davis Black™ so that the particular color of the asphalt, typically black and/or gray, is achieved, thus avoiding any unsightly or undesired whitened or other discolored areas. The amount of blackener added in asphalt cleaning operation is preferably around 5 lbs. in a 500 lb. formulation. It will be appreciated that the cost of the procedure become excessive if too much blackener is used and may result in too dark of a surface being achieved after the cleaning operation. As will be appreciated by those of skill in the arts, when cleaning colored surfaces, such as colored concrete, adequate amounts of pigmentation in the desired color, (e.g. red, green, blue, etc.) can be used and typically between 3 and 10 lbs. in a 500 lb. formulation is sufficient, more preferably about 5 lbs. in such formulations.

Finally, an additional component to the present invention relates to the use of micro-organisms to absorb and/or consume various petroleum based components in a stain of concrete and/or asphalt surfaces. In a preferred embodiment, a micro-organism composition called "oil gater" made by Phillips 66 company can be used as a substitute and/or an addition to any absorbent material such as clay. The amount of micro-organisms component in a 500 lb. formulation is less than about 5 lbs., but can be anywhere between about 5 lbs. and about 25 lbs. in a 500 lb. formulation.

In utilizing the present formulation to clean stained concrete/asphalt surfaces, the properly configured formulation is applied to the concrete/asphalt surface, preferably in lines of formulation spanning the dimensions of the oil stain to be cleaned. The material is then swept over the oil stain with a broom or other suitable device to achieve relatively uniform application of the formulation over the stained surface. A source of water is then used to apply a sufficient amount of water to the spread-out formulation, to provide a damp, albeit, not thoroughly wetted, formulation. In a preferred embodiment, a mist aperture setting of a garden sprayer is utilized to achieve proper application of water to the spread-out formulation. It is preferable that large drops of water are avoided so that a relatively uniform and consistent dampened formulation layer is achieved over the stained oil surface. The water acts to activate the detergent in the formulation and to hold down dust during the cleaning operation. The water also minimally dissolves the baking soda included in the formulation. The dampened formulation is permitted to rest on the concrete surface for a sufficient amount of time to permit the detergents and other agents to dissolve and/or otherwise dissipate the oil stain. Typically, at least about 15–30 minutes are required, but the formulation can be permitted to remain on the oil-stained surface for several hours. Although not typically required, the formulation can be re-wetted with the mist to achieve even further dissolution of detergent, activation of baking soda, etc.

After a sufficient amount of time has elapsed, the formulation is collected from the oil-stained surface. Typically such collection is achieved by merely sweeping the formulation from the surface. In certain situations, it may be necessary and/or desirable to further agitate the formulation on the surface of the concrete to achieve even further cleaning of such concrete surface. For example, a broom can be used to push the formulation to and fro over the surface several times. Other equipment and/or implements can be used to swirl or otherwise contact the formulation with the oil-stained surface to achieve even greater penetration than may be possible by merely brushing the material over such surface. In particular, a sweeper, such as a Tennant 186, manufactured by Tennant or any other type of small sweeper, can be used to brush/swirl the present formulation around to achieve desired contact between such formulation and the oil-stained surface.

It is important that the formulation be collected for disposal and/or reuse, rather than permitting such material to drain into a street sewer or other public drainage, thereby complying with Environmental Protection Agency rules and regulations. In this regard, excessive water should not be utilized on the formulation to permit such drainage to occur. Even after collection of the formulation by sweeping, a thin layer of the compound remains in the pores of the concrete surface, thus providing a desired "fresh-poured concrete" appearance of the cleaned surface.

Re-use of the present formulation is possible and desirable, from an economic as well as an environmental perspective. The product can be utilized numerous times, and in particular, is believed to be capable of use at least three times to ameliorate oil stains on concrete surfaces. After approximately three times, however, it is believed that the majority of the detergent and calcium baking soda components of the formulation are sufficiently dissipated and dissolved that further use of such of formulation would be unsatisfactory.

It has been found that periodic application of the present formulation in accordance with the present method helps prevent further oil stains from appearing on the cleaned surface. Thus, the present formulation has particular prophylactic characteristics, thus making further cleaning of such surfaces even easier than when the formulation is initially used.

The foregoing description of the present invention has been presented for the purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiment described herein above and further intended to explain best modes known of practicing the invention and to enable others skilled in the art to utilize the invention is such, or other embodiments and with various modifications required by the particular application(s) or use(s) of the present invention. It is intended that the appended claims be construed to include alternative embodiments to the extent permitted by the prior art.

What is claimed is:

1. A concrete/asphalt-cleaning formulation for ameliorating the appearance of oil stains on concrete/asphalt surfaces, comprising:
    between about 5% and 30% detergent;
    between about 5% and 30% calcium carbonate;
    between about 2% and 40% crushed corn/corn husk;
    between about 1% and 10% baking soda;
    with the remainder of said formulation comprising an ingredient selected from the group consisting of: fly ash, Portland cement, and kiln dust and mixtures thereof.

2. A concrete/asphalt-cleaning formulation for ameliorating the appearance of oil stains on concrete/asphalt surfaces, consisting essentially of:
    between about 10% and 20% detergent;
    between about 10% and 20% calcium carbonate;
    between about 10% and 30% crushed corn;
    between about 3% and 7% baking soda;
    with the remainder of said formulation comprising an ingredient selected from the group consisting of: fly ash, Portland cement, and kiln dust.

3. A concrete/asphalt-cleaning formulation for ameliorating the appearance of oil stains on concrete/asphalt surfaces, consisting essentially of:
    between about 5% and 30% detergent;
    between about 5% and 30% calcium carbonate;
    between about 2% and 40% crushed corn/corn husk;
    between about 1% and 10% baking soda;
    between about 1% and 20% of a micro-organism component;
    with the remainder of said formulation comprising an ingredient selected from the group consisting of: fly ash, Portland cement, and kiln dust and mixtures thereof.

4. The formulation set forth in claim 3, further comprising an asphalt blackening component.

5. The formulation as set forth in claim 3, further comprising a coloring component present in an amount of from about 3 to about 30 lbs. in a 500 lb. total formulation.

6. The formulation as set forth in claim 3, further comprising quartz sand of approximately 70 grade and present in an amount of between 50 and 200 lbs. in a total 500 lb. formulation.

7. A method for ameliorating an oil stain on a concrete/asphalt surface, comprising:
    (a) spreading an effective amount of a formulation onto an oil-stained concrete surface, said formulation comprising:
        between about 5% and 30% detergent;
        between about 5% and 30% calcium carbonate;
        between about 2% and 40% crushed corn;
        between about 1% and 10% baking soda;
        with the remainder of said formulation comprising an ingredient selected from the group consisting of: fly ash, Portland cement, and kiln dust and mixtures thereof;
    (b) dampening said formulation with water;
    (c) providing an effective amount of time in which said formulation can interact with said oil-stained concrete; and
    (d) collecting said formulation from said concrete surface, whereby said method ameliorates an oil stain from said concrete surface and provides a concrete surface having a clean appearance.

8. The method as set forth in claim 7, further comprising agitating said formulation after said step of dampening.

9. The method as set forth in claim 7, wherein said effective amount of said formulation comprises at least about ⅛ of an inch and ½ inch of formulation substantially evenly distributed over said surface.

10. The method as set forth in claim 7, further comprising reusing said formulation after said step of collecting on a further oil-stained concrete surface.

11. The method as set forth in claim 7, further comprising predetermining an amount of one or more of the ingredients selected from the group consisting of fly ash, Portland cement and kiln dust to substantially match the colored appearance of said concrete surface to be cleaned.

12. The method as set forth in claim 7, wherein said amount of calcium carbonate is adjusted upwardly in relation to the degree of whiteness desired of said concrete surface after performing said method.

13. The method as set forth in claim 7, further comprising rinsing said concrete surface with water after said collection step.

* * * * *